United States Patent [19]

Meyer et al.

[11] Patent Number: 4,987,302

[45] Date of Patent: Jan. 22, 1991

[54] PHOTOELECTRIC ANGLE MEASURING APPARATUS WHOSE OPTICALLY PROJECTING FOCAL LINE COINCIDES WITH THE AXIS OF ROTATION OF THE SCALE CARRIER

[75] Inventors: Hermann Meyer, Weissbach; Alfons Ernst, Traunreut, both of Fed. Rep. of Germany

[73] Assignee: Dr. Johannes Heidenhain GmbH, Traunreut, Fed. Rep. of Germany

[21] Appl. No.: 337,735

[22] Filed: Apr. 13, 1989

[30] Foreign Application Priority Data

Apr. 16, 1988 [DE] Fed. Rep. of Germany ....... 3812804
May 28, 1988 [DE] Fed. Rep. of Germany ....... 3818218

[51] Int. Cl.$^5$ .................................................. G01D 5/34
[52] U.S. Cl. ............................. 250/231.14; 250/237 G
[58] Field of Search ......... 250/237 G, 231.14, 231.16; 33/707, 706; 356/375, 395

[56] References Cited

U.S. PATENT DOCUMENTS

| | | | |
|---|---|---|---|
| 3,770,970 | 11/1973 | Trump | 250/231.16 |
| 4,714,349 | 12/1987 | Huber | 33/707 |
| 4,743,754 | 5/1988 | Ernst | 250/237 G |
| 4,746,792 | 5/1988 | Dil | 250/237 G |

FOREIGN PATENT DOCUMENTS 0096448 9/1986 European Pat. Off. .

OTHER PUBLICATIONS

"Winkelmessgerät (Angle Measuring Apparatus) LIDA 360", Jul. 1986.

Primary Examiner—David C. Nelms
Assistant Examiner—Que Tan Le
Attorney, Agent, or Firm—Toren, McGeady & Associates

[57] ABSTRACT

A photoelectric angle measuring apparatus for measuring relative angular positions of two objects which are rotatable relative to each other. The apparatus includes a scanning unit with a scanning scale connected to one of the objects. The scanning unit scans an angle scale of a scale carrier which is connected to the other object. Corresponding graduations of the scanning scale and the angle scale extend parallel to each other. The scanning unit includes an optically projecting element for the light ray path. The optically projecting element has a focal point which is located on the axis of rotation of the scale carrier or a focal line which coincides with the axis of rotation of the scale carrier.

4 Claims, 5 Drawing Sheets

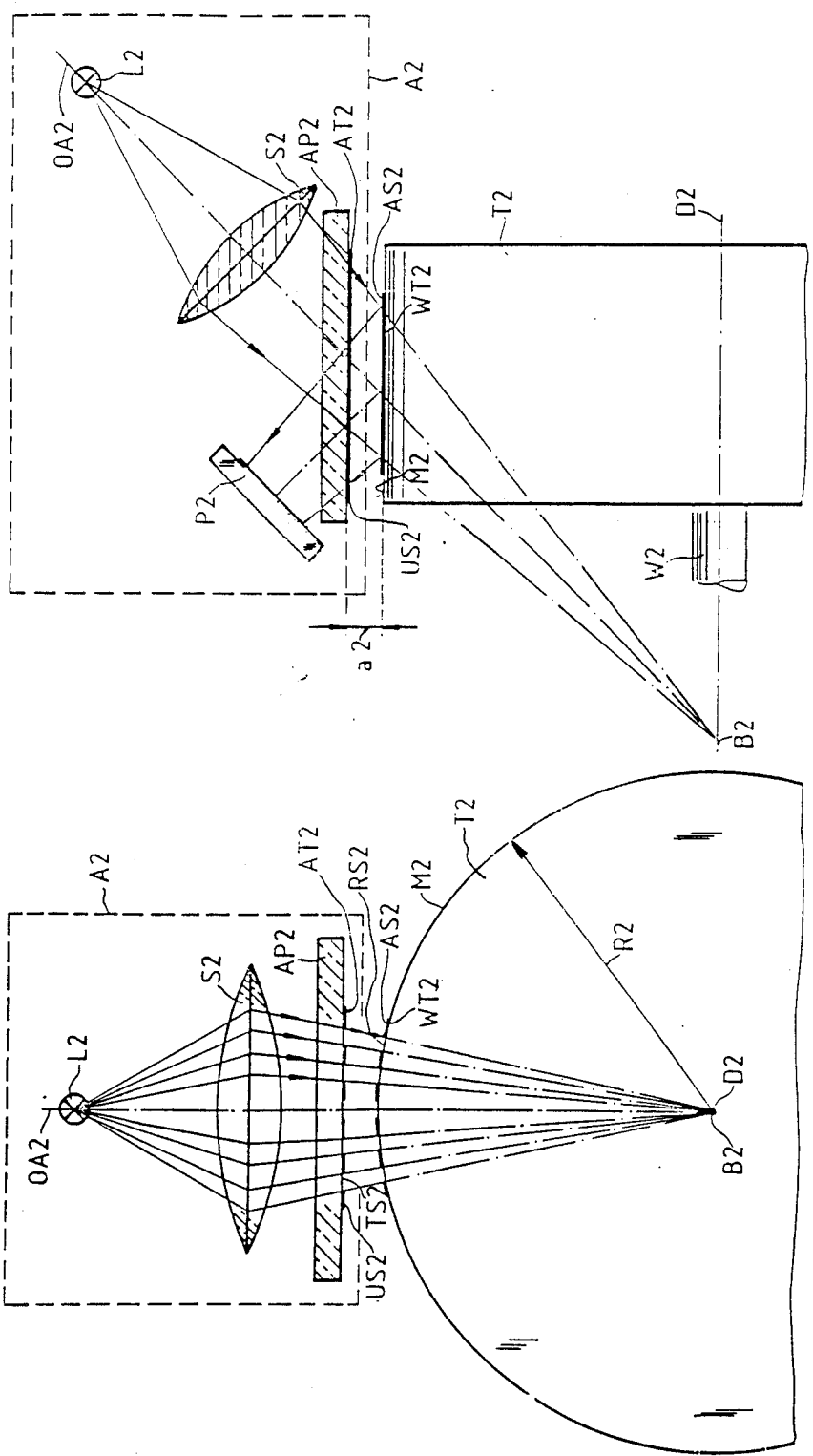

PHOTOELECTRIC ANGLE MEASURING APPARATUS WHOSE OPTICALLY PROJECTING FOCAL LINE COINCIDES WITH THE AXIS OF ROTATION OF THE SCALE CARRIER

BACKGROUND OF THE INVENTION

1. Field of the Invention

The present invention relates to a photoelectric angle measuring apparatus for measuring the relative angular positions of two objects which are rotatable relative to each other. The apparatus includes a scanning unit with a scanning scale connected to one of the objects. The scanning unit scans an angle scale of a scale carrier which is connected to the other object. Corresponding graduations or scale marks of the scanning scale and the angle scale extend parallel to each other.

2. Description of the Related Art

Absolute or incremental angle measuring apparatus of the above-described type are particularly used in processing machines for measuring the relative positions of a tool relative to a workpiece to be processed.

In such angle measuring apparatus, the angle scale of a rotatable scale carrier which is connected to the rotatable object is scanned by a scanning unit fastened to a stationary object for obtaining measurement values for the relative angular position of the rotatable object to the stationary object.

These angle scales can be formed in two different ways. The angle scale may be formed on the surface of a circular graduated disk at the periphery thereof in the form of radial graduations or scale marks. On the other hand, the angle scale is formed on the circumferential surface of a cylindrical scale carrier in the form of parallel graduations or scale marks.

European patent No. 0,096,448 describes a photoelectric angle measuring apparatus in which a scanning unit scans in incident light a radial angle scale on the surface of a circular graduation disk at the periphery thereof. In this scanning unit, the light rays emitted from a light source are directed through a semi-transparent mirror, a condenser and an optically projecting element which includes a cylindrical lens whose focal line coincides with the axis of rotation of the graduated disk and a conical mirror, onto the radial angle scale of the graduated disk and are reflected by the radial angle scale through the elements mentioned above and an objective onto a parallel scanning scale of a photoelectric sensor unit. The optically projecting element composed of cylindrical lens and conical mirror serves for the coincidental projection of the radial angle scale onto the parallel scanning scale. This known angle measuring apparatus is of complicated construction.

In a printed publication published by the company Dr. Johannes Heidenhein GmbH entitled "Winkelmessgerät [Angle Measuring Apparatus] LIDA 360", July 1986, a photoelectric angle measuring apparatus is described in which an angle scale in the form of a steel tape is fastened on the outer circumferential surface of a cylindrical scale carrier and is scanned in incident light by a scanning unit.

Such a photoelectric sensing unit may include, for example, a light source, a condenser, a semi-transparent mirror, a plane sensing plate with a sensing scale and a photoelectric cell. The light rays emitted by the light source are deflected by the condenser to extend parallel, are directed perpendicularly toward the scanning scale of the plane scanning plate after passing the semi-transparent mirror, are reflected by the angle scale on the outer circumferential surface of the cylindrical scale carrier and through the scanning scale of the scanning plate toward the semi-transparent mirror and reach the photoelectric cell after being deflected by the semi-transparent mirror. The plane scanning plate extends perpendicularly relative to the optical axis of the ray path and parallel at a certain distance to the generatrix of the circumferential surface of the scale carrier. Because of the curvature of the circumferential surface of the scale carrier, only the light rays in the median plane through the optical axis of the ray path and the axis of rotation of the scale carrier are reflected by the angle scale of the scale carrier perpendicularly through the scanning scale of the scanning plate. Because of this curvature of the circumferential surface of the scale carrier, the parallel light rays outside of this median plane directed parallel to this plane onto the angle scale of the scale carrier are reflected at a corresponding reflection angle and, thus, no longer are perpendicularly directed through the scanning scale of the scanning plate. This increasing divergence of the light rays with increasing distance on both sides from the median plane negatively influences the quality of the scanning signal which is periodically generated by the photoelectric cell, so that the resulting measurement values for the angular positions of the two objects may be afflicted with measurement inaccuracies.

These measurement inaccuracies can be eliminated by reducing the curvature of the angle scale (i.e., increasing the radius of the scale carrier), by reducing the distance of the scanning scale of the scanning plate from the angle scale on the circumferential surface of the scale carrier, and by reducing the length of the scanning scale perpendicularly of the median plane. However, these three measures have limits. The radius of the scale carrier is predetermined by the type of application of the angle measuring apparatus and the distance of the scanning scale from the angle scale cannot be reduced beyond a certain limit because of reasons related to sensing technology. The length of the scanning scale may not be below a certain length because otherwise the maximum amplitude of the scanning signal produced by the photoelectric cell becomes too low for a problem-free formation of measuring values.

It is, therefore, the primary object of the present invention to improve the sensing unit of a photoelectric angle measuring apparatus of the above-described type in such a way that improved measurement values are obtained.

SUMMARY OF THE INVENTION

In accordance with the present invention, the scanning unit for the light ray path includes an optically projecting element whose focal point is located on the axis of rotation of the scale carrier or whose focal line coincides with the axis of rotation of the scale carrier.

Providing an optical element for the light ray path in the scanning unit whose focal point or focal line is located on the axis of rotation of the cylindrical scale carrier according to the invention provides the advantage that it is possible in a simple manner without additional elements to eliminate measuring inaccuracies due to the curvature of a parallel angle scale on the circumferential surface of a scale carrier. Since the radius of the scale carrier for the angle scale is no longer limited to values which are as large as possible, the field of application of the proposed angle measuring apparatus is substantially increased.

The angle measuring apparatus according to the present invention has the additional advantage that measuring inaccuracies of a radial angle scale on a surface of the disk-like scale carrier which is scanned by means of a radial scanning scale are avoided because no mutual shading occurs between the radial angle scale and the radial scanning scale.

The various features of novelty which characterize the invention are pointed out with particularity in the claims annexed to and forming a part of this disclosure. For a better understanding of the invention, its operating advantages attained by its use, reference should be had to the drawings and descriptive matter in which there are illustrated and described preferred embodiments of the invention.

BRIEF DESCRIPTION OF THE DRAWING

In the drawing:

FIG. 3 is a schematic elevational view of a second embodiment of the photoelectric angle measuring apparatus;

FIG. 4 is a side view of the apparatus of FIG. 3;

DESCRIPTION OF THE PREFERRED EMBODIMENTS

Figure 2:
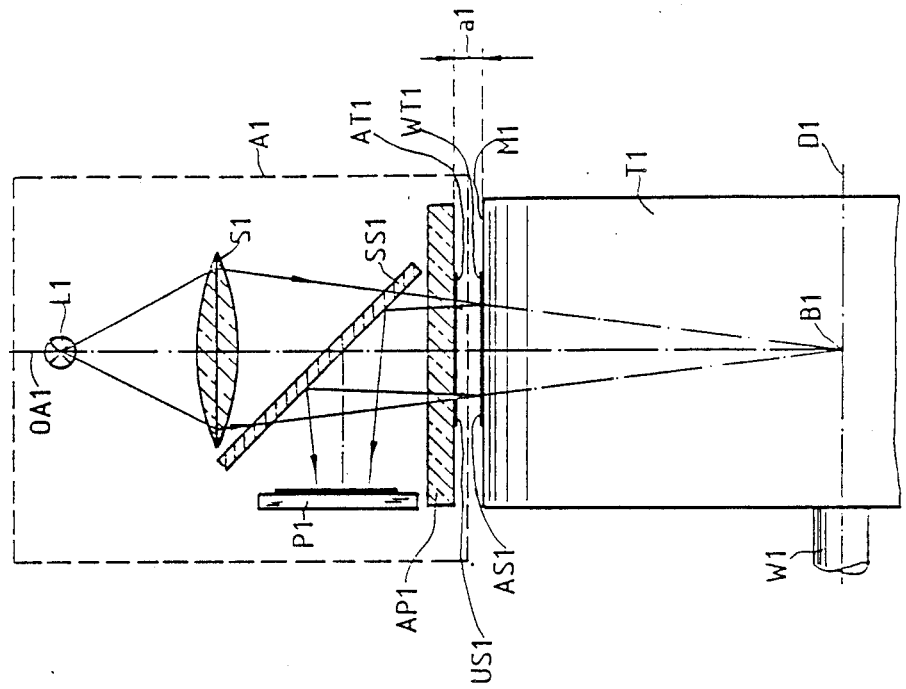
FIG. 2 is a side view of the apparatus of FIG. 1.
Figure 1:
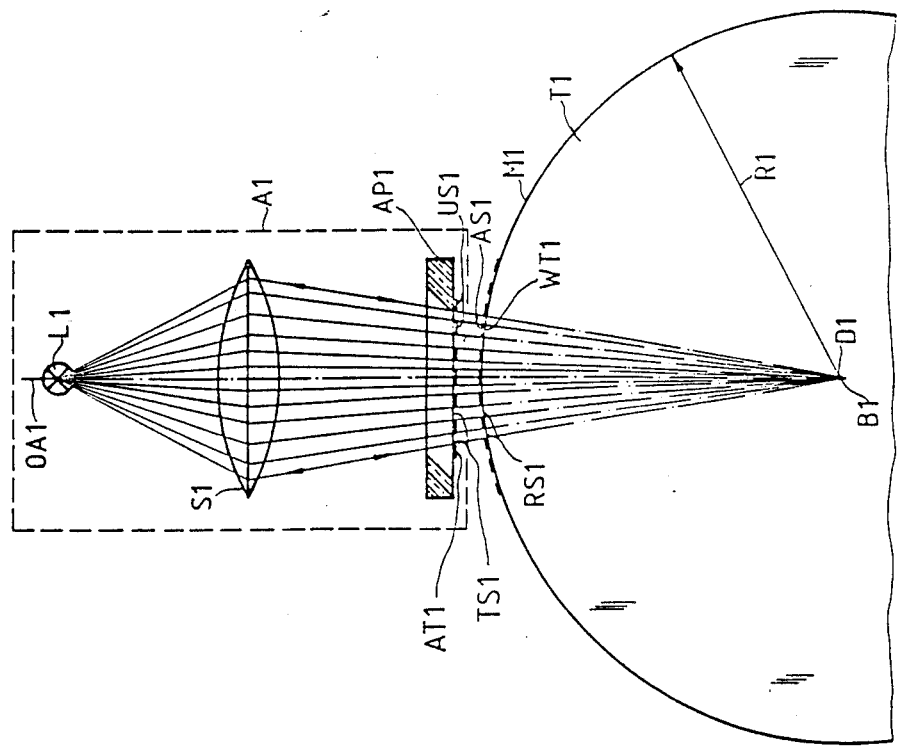
FIG. 1 is a schematic elevational view of a first embodiment of the photoelectric angle measuring apparatus according to the present invention.

FIG. 1 of the drawing is a schematic elevational view of a first photoelectric angle measuring apparatus according to the present invention. FIG. 2 of the drawing is a side view of the apparatus of FIG. 1. A cylindrical scale carrier T1 which is rotatably supported about an axis of rotation D1 is connected with its shaft W1 to a rotatable object, not shown. An angle scale WT1 is provided on the circumferential surface M1 of the cylindrical scale carrier T1. The angle scale WT1 is composed of reflecting graduations RS1 which extend parallel to the axis D1 of rotation of the scale carrier T1 and of absorbing graduations AS1. The graduations RS1 and AS1 have equal widths and are arranged alternatingly next to each other.

The angle scale WT1 is scanned in incident light by means of a scanning unit A1 which is connected to a stationary object, not shown. The scanning unit A1 includes a light source L1, an optical element S1 in the form of a collecting lens, a semi-transparent mirror SS1, a plane scanning plate AP1 with a scanning scale AT1 and a photoelectric cell P1; the scanning scale AT1 is composed of transparent graduations TS1 which extend parallel to the axis D1 of rotation of the scale carrier T1 and light-impermeable graduations US1. The graduations TS1 and US1 are of equal width and are arranged alternatingly next to each other.

The two objects referred to above may be, for example, a spindle and a bed of a processing machine, not shown.

The light rays emitted by the light source L1 are directed through the collecting lens S1, the semi-transparent mirror SS1 and the scanning scale AT1 of the plane scanning plate AP1, are reflected by the angle scale WT1 of the scale carrier T1 through the scanning scale AT1 onto the semitransparent mirror SS1 and are then directed onto the photoelectric cell P1 after being deflected by the semitransparent mirror SS1. The plane scanning plate AP1 is arranged perpendicularly relative to the optical axis OA1 of the ray path and parallel at a certain distance a1 to the generatrix of the circumferential surface M1 which extends perpendicularly to the optical axis OA1. The distance a1 is determined in accordance with the requirements for an optimum scanning.

Since in accordance with the present invention, the focal point B1 of the optical element S1 is located on the axis D1 of rotation of the scale carrier T1, all light rays follow a convergent ray path radially relative to the axis D1 of the scale carrier T1 onto the angle scale WT1 and are reflected into themselves by the angle scale WT1, as shown in FIG. 1. As a result, the quality of the scanning signal produced periodically by the photoelectric cell P1 cannot be negatively influenced and, thus, the measurement values for the relative angular positions of the two objects obtained from the periodic scanning signal in the known manner no longer has any measurement inaccuracies.

The curvature of the circumferential surface M1 or the radius R1 of the scale carrier T1 can be selected without disadvantageous consequences in accordance with the type of application of the apparatus. As shall be explained below with the aid of FIG. 5, the full length of the scanning scale AT1 of the scanning plate AP1 can be utilized for scanning the angle scale WT1 of the scale carrier T1. Since the rays are directed radially, the lattice constant of the scanning scale AT1 is selected relative to the lattice constant of the angle scale WT1 in accordance with the ratio R1+a1 to R1.

FIG. 3 is a schematic elevational view and FIG. 4 is a side view of a second photoelectric angle measuring apparatus. A cylindrical scale carrier T2 which is rotatably supported about an axis of rotation D2 is connected with its shaft W2 to a rotatable object, not shown. An angle scale WT2 is provided on the circumferential surface M2 of the cylindrical scale carrier T2. The angle scale WT2 is composed of reflecting graduations RS2 which extend parallel to the axis D2 of rotation of the scale carrier T2 and of absorbing graduations AS2. The graduations RS2 and AS2 are of equal width and are arranged alternatingly next to each other.

The angle scale WT2 is scanned in incident light by means of a scanning unit A2 which is connected to a stationary object, not shown. The scanning unit A2 includes a light source L2, an optical element S2 in the form of a collecting lens, a plane scanning plate AP2 with a scanning scale AT2 and a photoelectric cell P2; the scanning scale AT2 is composed of transparent graduations TS2 which extend parallel to the axis D2 of rotation of the scale carrier T2 and light-impermeable graduations US2. The graduations TS2 and US2 are of equal width and are arranged alternatingly next to each other.

The two objects referred to above may be, for example, a spindle and a bed of a processing machine, not shown.

The light rays emitted by the light source L2 obliquely relative to the axis D2 of the scale carrier T2 are directed through the collecting lens S2 and the scanning scale AT2 of the plane scanning plate AP2 and are reflected by the angle scale WT2 of the scale carrier T2 through the scanning scale AT2 onto the photoelectric cell P2. The plane scanning plate AP2 is arranged parallel at a certain distance a2 to the generatrix of the circumferential surface M2 which intersects the optical axis OA2. The distance a2 is determined in accordance with the requirements for an optimum scanning.

Since in accordance with the present invention, the focal point B2 of the optical element S2 is located on the axis D2 of rotation of the scale carrier T2, all light rays follow a convergent ray path radially relative to the axis D2 of the scale carrier T2 onto the angle scale WT2 and are reflected into themselves by the angle scale WT2, as shown in FIG. 3. As a result, the quality of the scanning signal produced periodically by the photoelectric cell P2 cannot be negatively influenced and, thus, the measurement values for the relative angular positions of the two objects obtained from the periodic scanning signal in the known manner no longer has any measurement inaccuracies.

Figure 5:
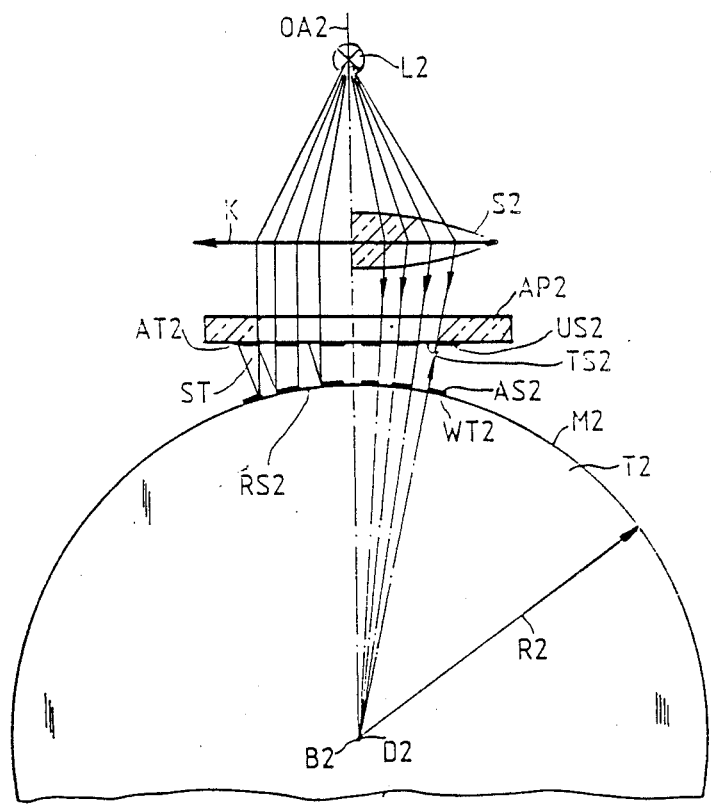
FIG. 5 is a schematic view illustrating two different light ray paths.

In FIG. 5, the right half thereof is a reproduction of the right half of FIG. 3; the left half of FIG. 5 illustrates a prior art apparatus. In the prior art apparatus, the light rays emitted by the light source L2 are directed to extend parallel by means of a condenser K, are directed through the scanning scale AT2 of the plane scanning plate AP2 and are reflected from the angle scale WT2 on the circumferential surface M2 through the scanning scale T2 toward the photoelectric cell. Because of the curvature of the circumferential surface M2 of the cylindrical scale carrier T2, the light rays directed parallel to and on both sides of the optical axis OA2 in the plane of the drawing do not perpendicularly meet the angle scale WT2 and, thus, are reflected toward the scanning scale AT2 after being deflected by certain reflection angles in the drawing plane. In the left half of FIG. 5, the light rays reflected by the reflecting graduation RS2 of the angle scale WT2 meet the light-impermeable graduation US2 of the scanning scale AT2 at location ST, so that the reflecting graduation RS2 of the angle scale WT2 is being shaded by the light-impermeable graduation US2 of the scanning scale AT2. This shading does not occur in the right side of FIG. 5 because of the light path according to the present invention in which the light rays are directed radially relative to the axis D2 of rotation of the scale carrier T2. Accordingly, contrary to the prior art, the invention makes it possible to utilize the full length of the scanning scale AT2 of the scanning plate AP2 for scanning the angle scale WT2 of the scale carrier T2. The curvature of the circumferential surface M2 or the radius R2 of the scale carrier T2 can be selected without disadvantageous consequences concerning measurement accuracy in accordance with the type of application of the apparatus. Since the rays are directed radially, the lattice constant of the scanning scale AT2 is selected relative to the lattice constant of the angle scale WT2 in accordance with the ratio R2+a2 to R2.

When the optical element S has a focal line instead of a focal point B, the focal line must coincide with the axis D of rotation of the scale carrier T, not shown.

Figure 6:
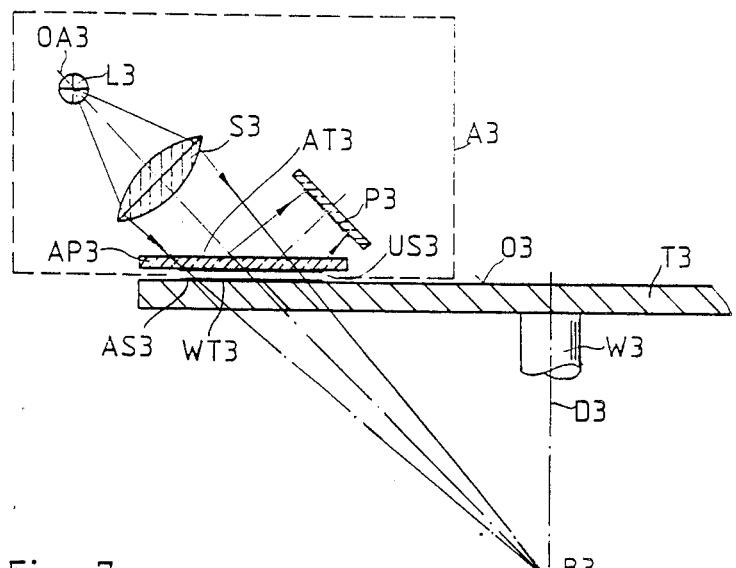
FIG. 6 is a schematic side view of a third embodiment of the photoelectric angle measuring apparatus.
Figure 7:
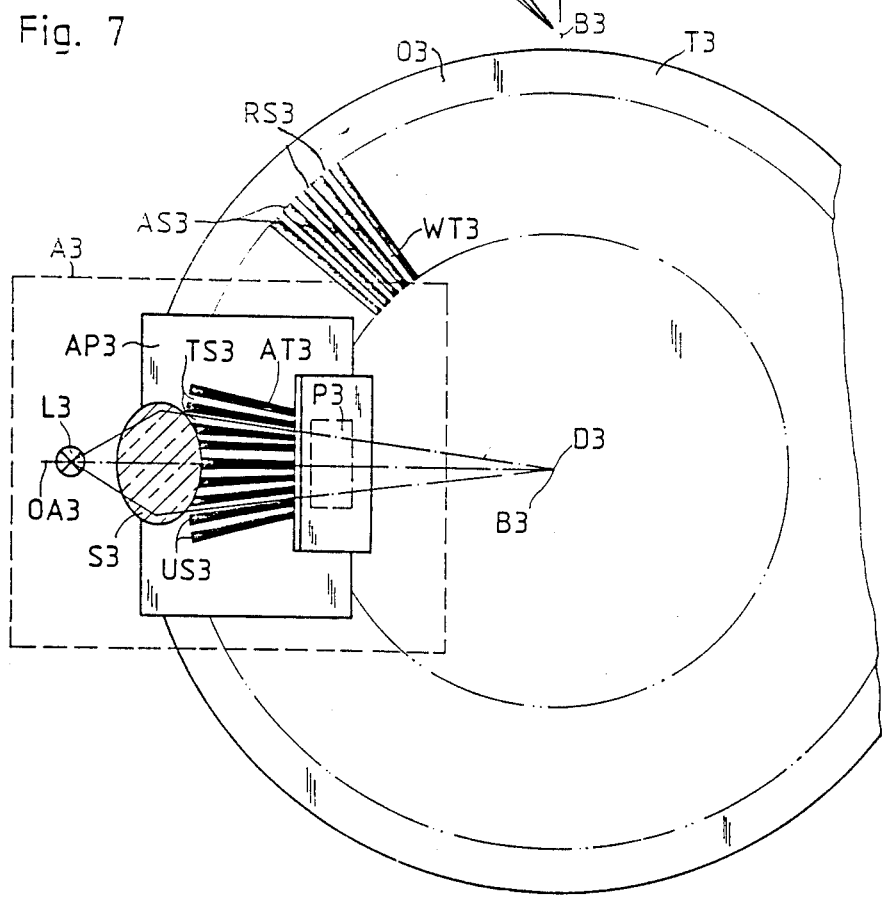
FIG. 7 is a top view of FIG. 6.

FIG. 6 of the drawing is a schematic side view of a third photoelectric angle measuring apparatus according to the present invention. FIG. 7 of the drawing is a top view of the apparatus of FIG. 6. A scale carrier T3 in the form of a graduated disk which is rotatably supported about an axis of rotation D3 is connected with its shaft W3 to a rotatable object, not shown. An angle scale WT3 is provided on a plane surface O3 of the disk T3. The angle scale WT3 is composed of reflecting graduations RS3 which extend radially to the axis D3 of rotation of the disk T3 and of absorbing graduations AS3. The graduations RS3 and AS have equal widths and are arranged alternatingly next to each other.

The radial angle scale WT3 is scanned in incident light by means of a scanning unit A3 which is connected to a stationary object, not shown. The scanning unit A3 includes a light source L3, an optical element S3 in the form of a collecting lens, a plane scanning plate AP3 with a scanning scale AT3 and a photoelectric cell P3; the scanning scale AT3 is composed of transparent graduations TS3 which extend parallel to the axis D3 of rotation of the disk T3 and lightimpermeable graduations US3. The graduations TS3 and US3 are of equal width and are arranged alternatingly next to each other.

The two objects referred to above may be, for example, a spindle and a bed of a processing machine, not shown.

The light rays emitted by the light source L3 obliquely relative to the surface O3 of the disk T3 and in the direction of axis D3 are directed through the collecting lens S3 and the scanning scale AT3 of the plane scanning plate AP3 are reflected by the angle scale WT3 of the disk T3 through the scanning scale AT3 onto the photoelectric cell P3 . The plane scanning plate AP3 is parallel at a certain distance to the plane surface O3. This distance is determined in accordance with the requirements for an optimum scanning.

Since in accordance with the present invention, the focal point B3 of the optically projecting element S3 is located on the axis D3 of rotation of the disk T3, all light rays follow a convergent ray path with optical axis OA3 in radial planes through the axis D3 and perpendicularly to the surface O3 of disk T3 onto the radial angle scale WT3 and are reflected by the radial angle scale WT3 in these planes, as shown in FIG. 7. As a result, the radial angle scale WT3 is projected coincidingly on the radial scanning scale AT3 and the quality of the scanning signal produced periodically by the photoelectric cell P3 cannot be negatively influenced and, thus, the measurement values for the relative angular positions of the two objects obtained from the periodic scanning signal in the known manner have no measurement inaccuracies.

Figure 8:
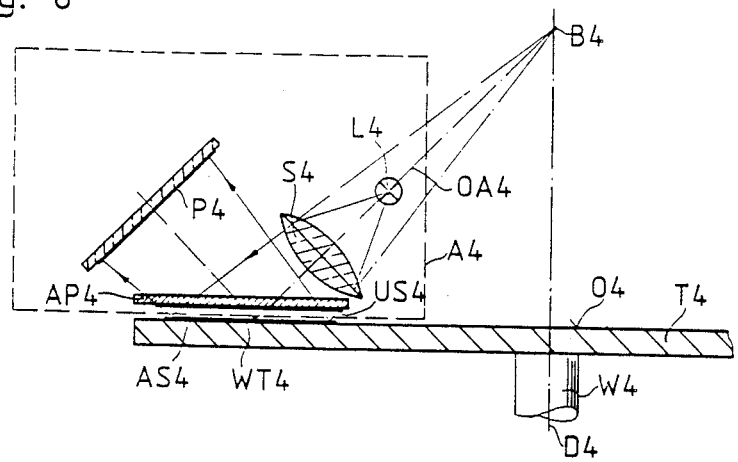
FIG. 8 is a side view of a force embodiment of the photoelectric angle measuring apparatus.
Figure 9:
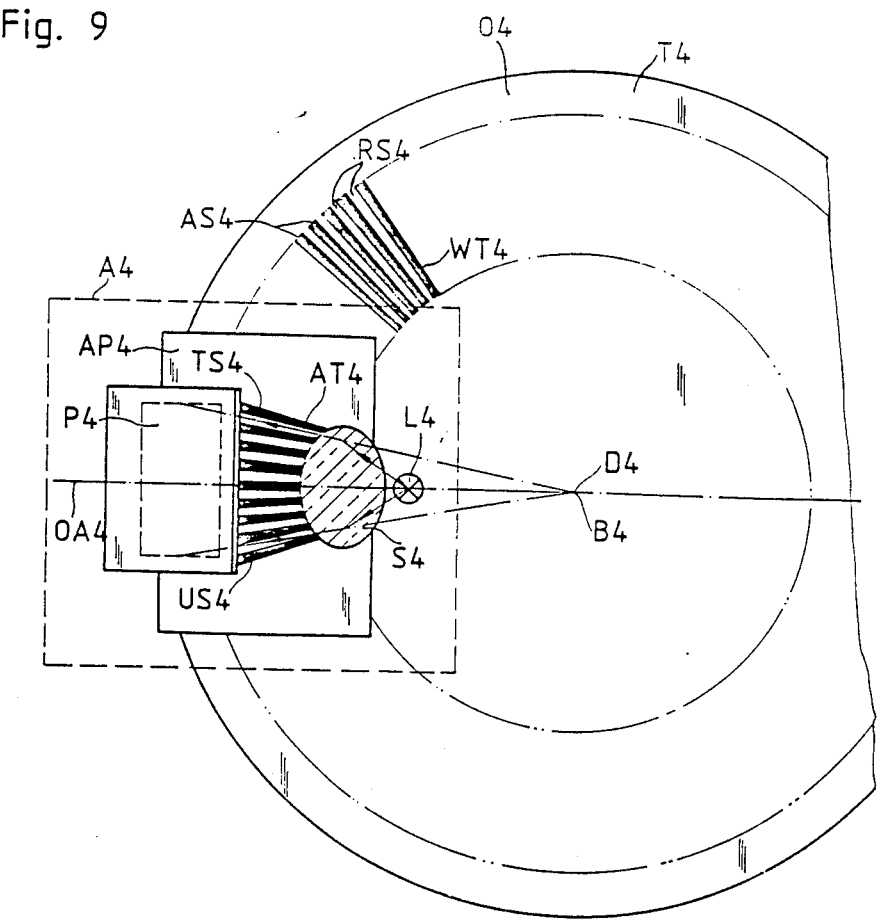
FIG. 9 is a top view of FIG. 8.

FIG. 8 of the drawing is a schematic side view of a fourth photoelectric angle measuring apparatus according to the present invention. FIG. 9 of the drawing is a top view of the apparatus of FIG. 8. A scale carrier T4 in the form of a graduated disk which is rotatably supported about an axis of rotation D4 is connected with its shaft W4 to a rotatable object, not shown. An angle scale WT4 is provided on a plane surface O4 of the disk T4 is mounted on the periphery thereof. The angle scale WT4 is composed of reflecting graduations RS4 which extend radially to the axis D4 of rotation of the disk T4 and of absorbing graduations AS4. The graduations RS4 and AS4 are of equal width and are arranged alternatingly next to each other.

The radial angle scale WT4 is scanned in incident light by means of a scanning unit A4 which is connected to a stationary object, not shown. The scanning unit A4 includes a light source L4, an optical element S4 in the form of a collecting lens, a plane scanning plate AP4 with a scanning scale AT4 and a photoelectric cell P4;

the scanning scale AT4 is composed of transparent graduations TS4 which extend radially to the axis D4 of rotation of the disk T4 and lightimpermeable graduations US4. The graduations TS4 and US4 are of equal width and ar arranged alternatingly next to each other.

The two objects referred to above may be, for example, a spindle and a bed of a processing machine, not shown.

The light rays emitted by the light source L4 obliquely relative to the surface O4 of the disk T4 and away from axis D4 are directed through the collecting lens S4 and the scanning scale AT4 of the plane scanning plate AP4 are reflected by the angle scale WT4 of the disk T4 through the scanning scale AT4 onto the photoelectric cell P4. The plane scanning plate AP4 is arranged parallel at a certain distance to the plane surface O4 of the disk T4. This distance is determined in accordance with the requirements for an optimum scanning.

Since in accordance with the present invention, the focal point B4 of the optically projecting element S4 is located on the axis D4 of rotation of the disk T4, all light rays follow a convergent ray path with optical axis OA4 in radial planes through the axis D4 and perpendicularly to the surface O4 of disk T4 onto the radial angle scale WT4 and are reflected by the radial angle scale WT4 in these planes, as shown in FIG. 9. As a result, the radial angle scale WT4 is projected coincidingly on the radial scanning scale AT4 and the quality of the scanning signal produced periodically by the photoelectric cell P4 cannot be negatively influenced and, thus, the measurement values for the relative angular positions of the two objects obtained from the periodic scanning signal in the known manner have no measurement inaccuracies.

The corresponding graduations RS, AS, TS, US of the angle scales WT and the scanning scales AT extend parallel to each other.

In addition to the above-described incremental angle measuring apparatus, the present invention can also be successfully utilized in absolute angle measuring apparatus. Also, the invention can be successfully used in methods employing incident light and in methods employing transmitted light and in methods employing combinations of incident light and transmitted light.

While specific embodiments of the invention have been shown and described in detail to illustrate the application of the inventive principles, it will be understood that the invention may be embodied otherwise without departing from such principles.

We claim:

1. A photoelectric angle measuring apparatus for measuring relative angular positions of two objects which are rotatable relative to each other, the apparatus comprising a scanning unit with a scanning scale connected to one of the objects, and a scale carrier having an axis of rotation, the scale carrier including an angle scale and being connected to the other object, the scanning scale and the angle scale having graduations, the corresponding graduations of the scanning scale and of the angle scale extending parallel to each other, the scanning unit being mounted for scanning the angle scale of the scale carrier, the scanning unit including means for generating a light ray path, wherein
   (a) the scanning unit includes an optically projecting element for the light ray path, so that the light rays of the light ray path intersect on the axis of rotation of the scale carrier;
   (b) the scale carrier is cylindrically shaped and has a circumferential surface, the angle scale including parallel graduations placed on the circumferential surface, and wherein the scanning scale is placed on a plane scanning plate, the scanning scale including parallel graduations which extend parallel to the axis of rotation of the scale carrier; and
   (c) the scanning unit includes a light source, the optically projecting element, the plane scanning plate with the scanning scale and at least one photoelectric cell.

2. The angle measuring apparatus according to claim 1 wherein the scanning unit additionally includes a semi-transparent mirror wherein the light source and the optically projecting element are positioned such that the light ray path extends perpendicularly to the axis of rotation of the scale carrier.

3. The angle measuring apparatus according to claim 1 wherein the scanning scale and the angle scale each have a lattice constant and each are spaced from the axis of rotation of the scale carrier by a predetermined distance, wherein the lattice constant of the scanning scale and the lattice constant of the angle scale are proportional to the distances thereof from the axis of rotation of the scale carrier.

4. A photoelectric angle measuring apparatus for measuring relative angular positions of two objects which are rotatable relative to each other, the apparatus comprising a scanning unit with a scanning scale connected to one of the objects, and a scale carrier having an axis of rotation, the scale carrier including an angle scale and being connected to the other object, the scanning scale and the angle scale having graduations, the corresponding graduations of the scanning scale and of the angle scale extending parallel to each other, the scanning unit being mounted for scanning the angle scale of the scale carrier, the scanning unit including means for generating a light ray path, wherein
   (a) the scanning unit includes an optically projecting element for the light ray path, so that the light rays of the light ray path intersect on the axis of rotation of the scale carrier;
   (b) the scale carrier is disk-shaped and has a plane surface, the angle scale including radial graduations placed on the plane surface, and wherein the scanning scale is placed on a plane scanning plate, the scanning scale including graduations which extend radially relative to the axis of rotation of the scale carrier; and
   (c) the scanning unit includes a light source, the optically projecting element, the plane scanning plate with the scanning scale and at least one photoelectric cell.

* * * * *